United States Patent [19]

Ide

[11] Patent Number: 4,843,709

[45] Date of Patent: Jul. 4, 1989

[54] SHELL-TYPE MILLING CUTTER AND METHOD FOR ATTACHING THE SAME

[75] Inventor: Manabu Ide, Fujinomiya, Japan

[73] Assignee: Kabushiki Kaisha Aideie, Shizuoka, Japan

[21] Appl. No.: 107,599

[22] PCT Filed: Dec. 25, 1986

[86] PCT No.: PCT/JP86/00649

§ 371 Date: Sep. 3, 1987

§ 102(e) Date: Sep. 3, 1987

[87] PCT Pub. No.: WO87/04102

PCT Pub. Date: Jul. 16, 1987

[30] Foreign Application Priority Data

Jan. 14, 1986 [JP] Japan .................................. 61-5771

[51] Int. Cl.⁴ .............................................. B23C 5/26
[52] U.S. Cl. ...................................... 29/525; 409/234
[58] Field of Search .............. 409/239, 200; 403/309, 403/314, 344, 365–368, 370, 371; 279/87; 429/525

[56] References Cited

U.S. PATENT DOCUMENTS

| 1,797,296 | 3/1931 | Ray | 409/234 X |
| 2,912,904 | 11/1959 | Peterson | 409/234 X |
| 3,656,785 | 4/1972 | Lothar | 403/371 X |
| 4,322,190 | 3/1982 | Anderson | 409/234 |
| 4,325,664 | 4/1982 | Mori | 409/234 |

Primary Examiner—Eugene F. Desmond
Attorney, Agent, or Firm—Koda and Androlia

[57] ABSTRACT

This invention relates to a shell-type milling cutter and a method for attaching the same wherein an area for allowing a shell-type milling cutter (1) to be in closely contact with a cutter arbour (3) is increased, whereby it makes possible a heavy-duty cutting work at a high speed which is close to that of an integral structure type milling cutter (1), besides attachment and exchange for the shell-type milling cutter can be very easily carried out.

The shell-type milling cutter and the method for attaching the same according to the present invention are attained by such a manner that a fitting hole (1a) of the milling cutter (1) is formed as a tapered hole, a projection (2c) of a bush (2) is engaged with a concave groove of a clamping bolt (4), and the bush (4) is forcibly inserted into the fitting hole to secure the milling cutter (1) to the cutter arbour (3).

1 Claim, 3 Drawing Sheets

Fig. 1
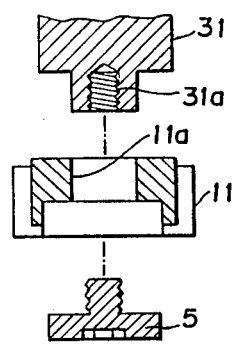
Fig. 2
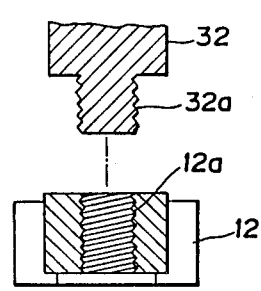
Fig. 3A
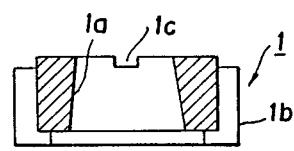
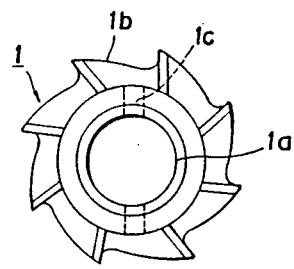
Fig. 3B

Fig. 4A
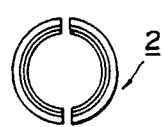
Fig. 5A
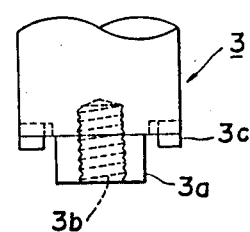
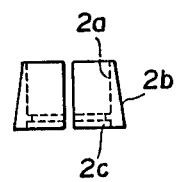
Fig. 4B
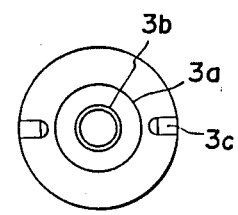
Fig. 5B
Fig. 6
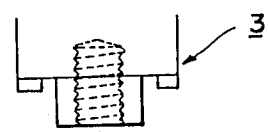
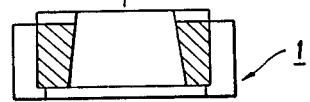
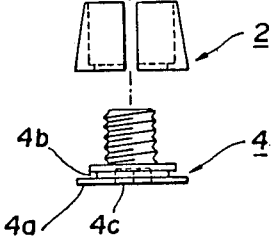

SHELL-TYPE MILLING CUTTER AND METHOD FOR ATTACHING THE SAME

TECHNICAL FIELD

This invention relates to a shell-type milling cutter and a method for attaching the shell-type milling cutter. More particularly, the present invention relates to such a shell-type milling cutter having a very high attachment strength and accuracy in the cutting work. Such good peformance as described above is derived from a provision of a hole for attaching or fitting the shell-type milling cutter to a cutter arbour and which is formed into a tapered hole expanding downwards for attaining a more positive attachment of such shell-type milling cutter to the cutter arbour. As a result, an end surface of the upper portion and opposite side surfaces of the fitting hole function to attain more firm fixation of the milling cutter, and such an area for allowing the shell-type milling cutter to be in close contact with the cutter arbour increases, and in addition the performance of the shell-type milling cutter according to the present invention becomes substantially the same with that of an integral structure type milling cutter in even high-speed and heavy-duty cutting operations, besides easy attachment and detachment of a milling cutter can be effected in the present invention. The invention relates also to a method for attaching the above-mentioned shell-type milling cutter to the cutter arbour.

BACKGROUND ART

In general, when a shell-type milling cutter is compared with such an integral structure type milling cutter being integrally composed of a cutting edge portion and a shank portion, the shell-type milling cutter is inferior to that of the integral structure type in all the points of performance such as rigidity, machinability, strength, accuracy of finishing, wear proof and the like, since an area where the cutting edge portion of the milling cutter is in close contact with the fitting shaft of a cutter arbour is small and a degree of such close contact is low. On the other hand, if size of a milling cutter itself is large, the manufacture of such an integral structure type milling cutter becomes expensive, besides it is very uneconomical because the worn cutting edge portion of which must be replaced by a fresh one together with a fresh shank portion despite unnecessary replacement of the old shank portion which has not yet been worn, and for this reason, a shell-type milling cutter only the edge portion of which is exchangeable and which is inexpensive and easily manufactured has been used at the present time. In this connection, as a method for attaching such shell-type milling cutter to its cutter arbour, there has heretofore been, as shown in FIG. 1, such a method that a fitting shaft (31a) of a cutter arbour (31) is inserted into a fitting hole of a shell-type milling cutter (11), and further the milling cutter (11) is fixed to the cutter arbour (31) by means of a bolt (5). In this method, however, when a cutting work is conducted, the bolt (5) becomes loose due to vibration derived from the cutting, so that a degree of close contact of the milling cutter (11) to the cutting arbour (31) becomes poor. In this respect, when a rotational frequency or an amount of cut is increased in order to cover such defects as described above, vibration and the like produces, and as a result there arises a further disadvantage such that a life of the shell-type milling cutter (11) is remarkably shortened, accuracy in the finishing becomes inferior so that the rotational frequency and the amount of cut are restricted, whereby an improvement of the cutting efficiency is significantly impeded. Furthermore, there is another method for attaching a shell-type milling cutter to a cutter arbour wherein the outer circumference (32a) of a fitting shaft of the shell-type cutter arbour (32) as well as a fitting hole (12a) of the shell-type milling cutter are defined with a left-handed screw thread, respectively, as shown in FIG. 2, and both the members are threadedly engaged with each other. According to this method, when a cutting work is made, the screw is automatically fastened to increase a degree of close contact of the milling cutter (12) to the cutter arbour (32), so that high-speed rotation and heavy-duty cutting becomes possible.

In this case, however, such cutting resistance resulted is added to the threaded portion as a load, so that there are such serious disadvantages that the threaded portion is completely fastened with increase of the cutting resistance, and in the most serious situation, seizure phenomenon occurs and it makes impossible to separate the shell-type milling cutter (12) from the cutter arbour (32), whereby exchange of the shell-type miling cutter (12) becomes impossible, and the circularity of which becomes incorrect.

In view of the above, the present invention has been made to eliminate disadvantages involved in the aforesaid conventional shell-type milling cutters as well as a method for attaching such shell-type milling cutters. Namely, an object of the present invention is to provide a shell-type milling cutter and a method for attaching the shell-type milling cutter having the undermentioned advantages. The shell-type milling cutter according to the present invention is obtained by the following manner. To a fitting shaft of a cutter arbour the extreme end of which is formed into a straight stepped portion, a milling cutter on which has been bored a tapered hole having somewhat larger diameter than that of said fitting shaft is loosely fitted. Before inserting two divided tapered members into a gap defined by said fitting shaft and said tapered hole, each projection of said tapered members is fitted into a concave groove defined on a bolt to engage them with each other. These tapered members are forcibly inserted into the gap defined by said fitting shaft and said tapered hole while maintaining said engagement state, whereby said milling cutter is secured to said fitting shaft while keeping said forcible insertion. As a result, an area where the shell-type milling cutter is allowed to be in close contact with the cutter arbour increases and in addition, since the projections of the tapered members have been fittingly engaged with the concave groove of the bolt, accuracy in shaft center is very well, rigidity and attachment strength increase, so that the resulting shell-type milling cutter makes high-speed and heavy-duty cutting possible. Consequently, cutting efficiency of the shell-type milling cutter of the present invention becomes substantially the same with that of an integral structure type milling cutter. Moreover, a milling cutter can be very easily exchanged in the present invention.

DISCLOSURE OF THE INVENTION

Namely, according to the present invention, a fitting hole of a shell-type milling cutter is bored as a tapered hole, a projection of a bush is engaged with a concave groove of a clamping bolt, and said bush is forcibly inserted into the fitting hole to secure the shell-type milling cutter to a cutter arbour. Thus, an area where the shell-type milling cutter is in close contact with the cutter arbour increases so that a degree of close contact becomes high, and as a result the shell-type milling cutter according to the present invention becomes possible to effect heavy-duty cutting work at a high speed being close to that of an integral structure type milling cutter, besides exchange of a cutter arbour can be very easily carried out in accordance with the present invention.

BRIEF DESCRIPTION OF THE DRAWINGS

FIGS. 1 and 2 are exploded sectional views each illustrating a method for attaching a conventional shell-type milling cutter; FIGS. 3(A) and (B) are sectional and bottom views each showing a milling cutter by which the shell-type milling cutter and the method for attaching the same according to the present invention are realized; FIGS. 4 (A) and (B) are plan and front views each showing a bush by which the shell-type milling cutter and the method for attaching the same according to the present invention are realized; FIGS. 5(A) and (B) are front and bottom views each showing a cutter arbour by which the shell-type milling cutter and the method for attaching the same according to the present invention are realized; FIG. 6 is an exploded sectional view illustrating a method for attaching the shell-type milling cutter according to the present invention.

THE BEST MODE FOR EMBODYING THE INVENTION

The present invention will be described in more detail hereinbelow by referring to the accompanying drawings.

Figure 7:
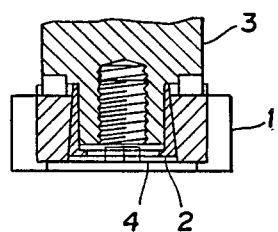
FIG. 7 is a sectional view explaining an attached state of the shell-type milling cutter according to the present invention.
Figure 8:
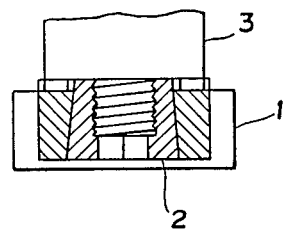
FIG. 8 is a sectional view illustrating an forcible insertion means according to the present invention.

FIG. 6 illustrates an example of the milling cutter used in the present invention wherein reference numeral 1 designates a shell-type milling cutter, and a tapered fitting hole 1a expanding downwardly is defined at the central portion of said shell-type milling cutter 1 and further a key way 1c for whirl-stop is defined on the upper end thereof. FIGS. 4(A) and 4(B) are plan and front views each showing a bush for realizing the shell-type milling cutter according to the present invention in which the bush is made of a metal and which is composed of tapered members 2 obtained by dividing vertically the tapered bush into two pieces, the inner surface of the tapered member 2 is a straight surface 2a, the lower portion of which is provided with a linear projection 2c along the circumferential direction thereof, and the outer surface of the bush is formed into a tapered surface 2b so as to be in closely contact with the tapered fitting hole 1a of the shell-type milling cutter 1. A length of the tapered member 2 is such that when the tapered member is forcibly inserted into the fitting hole 1a of the shell-type milling cutter 1, the opposite end surfaces of the tapered member become flush with the opposite end surfaces of the shell-type milling cutter 1 or the former length is somewhat shorter than the latter length. FIG. 5 shows a cutter arbour provided with a fitting shaft 3a the extreme end of which is formed into a straight stepped portion and a key 3c for whirl-stop projecting from the stepped portion. A length of the fitting shaft 3a is substantially the same with that of the fitting hole 1a of the shell type milling cutter 1, and a tapped hole 3b is defined on the extreme end portion of the fitting shaft. FIG. 6 is an exploded sectional view illustrating the method for attaching a shell-type milling cutter according to the present invention wherein a forcibly inserting means (bolt) 4 is a hexagon socket head cap screw 4c, and a concave groove 4b is defined around the circumference of the head 4a of the hexagon socket head cap screw. The projection 2c of the tapered member 2 is fitted into the concave groove 4b to engage them with each other. Furthermore, the tapered member 2 may be, for example, directly screwed with the fitting shaft 3a to attain a forcible insertion thereof as shown in FIG. 8 as another forcible insertion of the tapered member 2 without using the bolt 4.

Next, the attaching method according to the present invention and the operation thereof will be described hereinbelow. First of all, the fitting hole 1a of the shell-type milling cutter 1 is loosely fitted to the fitting shaft 3a of the cutter arbour 3, and the key way 1c for whirl-stop of the milling cutter as well as the key 3c for whirl-stop of the cutter arbour are fitted to their related members, respectively. Then, in the case when the tapered members 2 are inserted into a gap defined between lthe fitting shaft 3a and the fitting hole 1a, such insertion is conducted in such a manner that each projection 2c of two divided tapered members 2 is fitted in the concave groove 4b of the bolt 4 and engaed therewith, the tapered members 2 are inserted into the gap defined between the fitting shaft 3a and the fitting hole 1a while maintaining the above fitted and engaged situation, and at the same time the bolt 4 is also screwed with the tapped hole 3b of the fitting shaft 3a and fastened with each other, whereby the tapered members 2 engaged with the bolt 4 are introduced into said gap and forced therein by means of fastening action of the bolt 4, so that the shell-type milling cutter is attached to the cutter arbour 3. In this attached state, since the fitting hole 1a has been formed into a tapered hole, the upper end surface of the shell-type milling cutter 1 is closely contact with the end surface in the stepped portion of the cutter arbour 3, whilst the tapered members 2 are compressed by means of the fitting hole 1a, so that two divided tapered members 2 become in close contact with the fitting shaft 3a. As a result, the shell-type milling cutter 1 is firmly secured to the fitting shaft 3a of the cutter arbour 3 in a close contact manner by means of said upper end surface and the whole surface of the fitting hole 1a through the tapered members 2. On one hand, even if the shell-type milling cutter 1 shows signs of moving in the direction along which the fitting hole is tapered with downward expansion during cutting work, such movement compresses the tapered members 2 so that the shell-type milling cutter comes to be in more close contact with the fitting shaft 3a of the cutter arbour 3.

On the other hand, removal of the shell-type milling cutter 1 from the cutter arbour 3 will be described hereinbelow. In this case, since the fitting hole 1a is formed into a tapered hole and further the tapered members 2 are used, almost no broaching load is applied to the bolt 4 so that the bolt 4 can be easily loosened without seizure. Thus, even if the tapered members 2 are forcibly inserted into the fitting hole, they may be simply drawn out therefrom in view of the profile of the tapered members, and as a result the removal of the tapered members are also easy. It is to be noted that provision of the key way 1c and the key 3c both for whirl-stop is not necessarily required in the above described case.

INDUSTRIALLY APPLICABLE FIELD

As described above, in the shell-type milling cutter and the method for attaching the same according to the present invention, a fitting hole for attaching the shell-type milling cutter to its cutter arbour is defined into a tapered hole expanding downwards. As a result, the practical value of this invention is significant in such that both the surfaces of the upper end surface of the milling cutter and the surface of the fitting hole 1a are firmly fixed in case of the attachment, so that the attachment strength thereof increases remarkably and in addition, the circularity thereof is also correct, thus no deviation nor vibration is observed; that because of the above construction, accuracy in the cutting work is elevated, high-speed and heavy-duty cutting becomes possible, besides the cutting efficiency is substantially the same with that of an integral structure type milling cutter; and that attachment and detachment for this shell-type milling cutter can very easily be effected.

I claim:

1. (four times amended) A method for attaching a shell-type milling cutter charcterized by fitting loosely said shell-type milling cutter to a fitting shaft of a cutter arbour, said milling cutter having a tapered fitting hole which expands downwardly and has a suitably larger diameter than said fitting shaft of said cutter arbour, the extreme end of said cutter arbour being formed into a straight stepped portion, and forcibly fitting two semicircular tapered members, each of said semicircular tapered members being provided with a projection on the lower inner circumference, into a gap defined between said fitting shaft and said fitting hole by a bolt which engages with said projections and is screwed into said fitting shaft, said tapered members being provided by vertically dividing a cylindrical bush, which has an outer tapered surface and an inner straight surface, into two pieces.

* * * * *